United States Patent
Izumi et al.

(10) Patent No.: US 7,088,385 B2
(45) Date of Patent: Aug. 8, 2006

(54) INFORMATION APPARATUS, PICTURE DISPLAY METHOD, AND PICTURE TRANSMITTING METHOD

(75) Inventors: Yuuji Izumi, Kokubunji (JP); Masaki Nose, Shiki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 286 days.

(21) Appl. No.: 10/423,806

(22) Filed: Apr. 26, 2003

(65) Prior Publication Data

US 2003/0202087 A1    Oct. 30, 2003

(30) Foreign Application Priority Data

Apr. 26, 2002    (JP) .............................. 2002-127333

(51) Int. Cl.
*H04N 7/14*    (2006.01)

(52) U.S. Cl. ............................. 348/14.01; 348/14.02; 348/14.07; 379/93.17

(58) Field of Classification Search .. 348/14.01–14.09, 348/14.1, 14.11, 14.12, 14.13, 14.14, 14.16; 379/93.17; 345/903, 547

See application file for complete search history.

(56) References Cited

U.S. PATENT DOCUMENTS 6,593,955 B1 *   7/2003   Falcon .................... 348/14.01

2002/0154209 A1 *  10/2002  Kenoyer et al. ......... 348/14.07

FOREIGN PATENT DOCUMENTS

| GB | 2313251 A | * | 11/1997 |
|---|---|---|---|
| JP | 9-121333 |  | 5/1997 |
| JP | 2000-92502 |  | 3/2000 |
| JP | 2000-175167 | * | 6/2000 |
| JP | 402246588 A | * | 10/2000 |
| JP | 2001-281758 |  | 10/2001 |
| JP | 2002041526 A | * | 2/2002 |
| JP | 2002-111998 |  | 4/2002 |

OTHER PUBLICATIONS

Windows Media Player 7.1 for Win 98, Win 2000, WinMe (English version) available from the Internet Page "Windows Media Download Center" of Microsoft Co., Ltd.

The catalog shows that the mobile phone supports "ez movie", a motion video distribution service, and has a function of reproducing MPEG-4 videos.

* cited by examiner

*Primary Examiner*—Melur Ramakrishnaiah
(74) *Attorney, Agent, or Firm*—Foley & Lardner, LLP

(57) ABSTRACT

An information apparatus includes, a data forming section that forms a combination of streaming data and one of i) still picture data and ii) a code used to obtain still picture data, and a data transferring section that transfers the formed combination of the streaming data and the one of the still picture data and the code to another apparatus for display on the other apparatus.

12 Claims, 16 Drawing Sheets

| Position<br>(North latitude, East longitude) | Range<br>(Radius : km) | Still picture<br>file name | Remark |
|---|---|---|---|
| 35 : 21 : 0, 138 : 44 : 0 | 30 | Mt-Fuji.jpg | Mt-Fuji |
| 35 : 19 : 22, 139 : 35 : 9 | 10 | Kamakura.gif | Kamakura |
| 35 : 40 : 15, 139 : 47 : 56 | 0.3 | Kokkai.gif | Diet building |
| ⋮ | ⋮ | ⋮ | ⋮ |

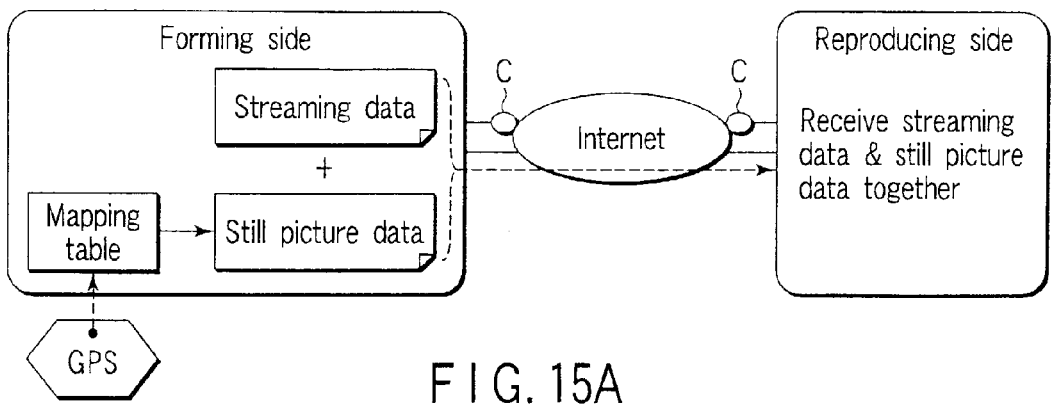
F I G. 15A
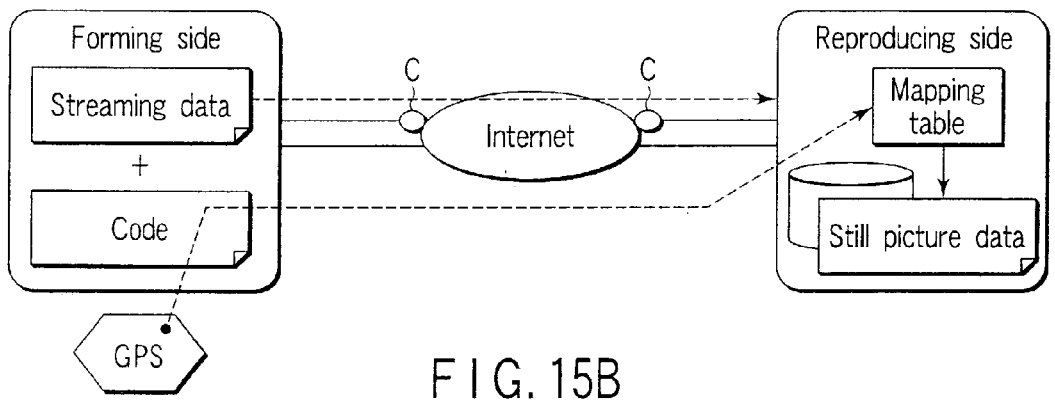
F I G. 15B
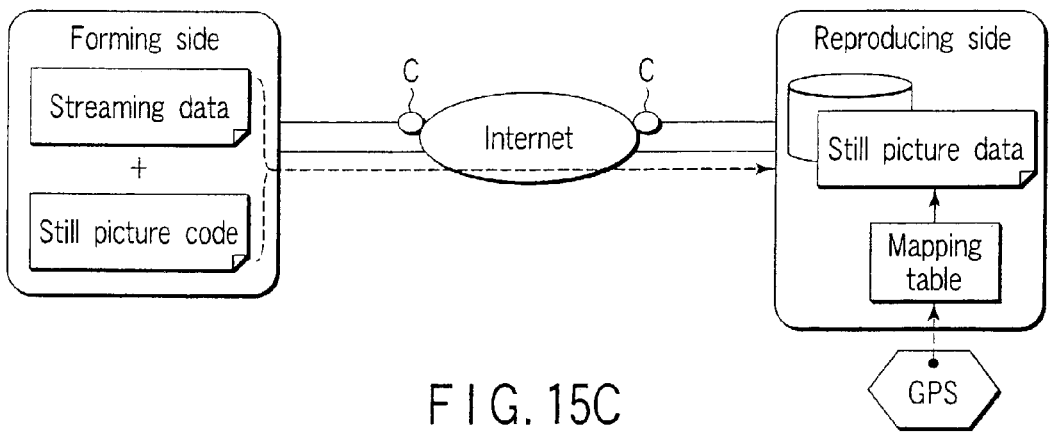
F I G. 15C

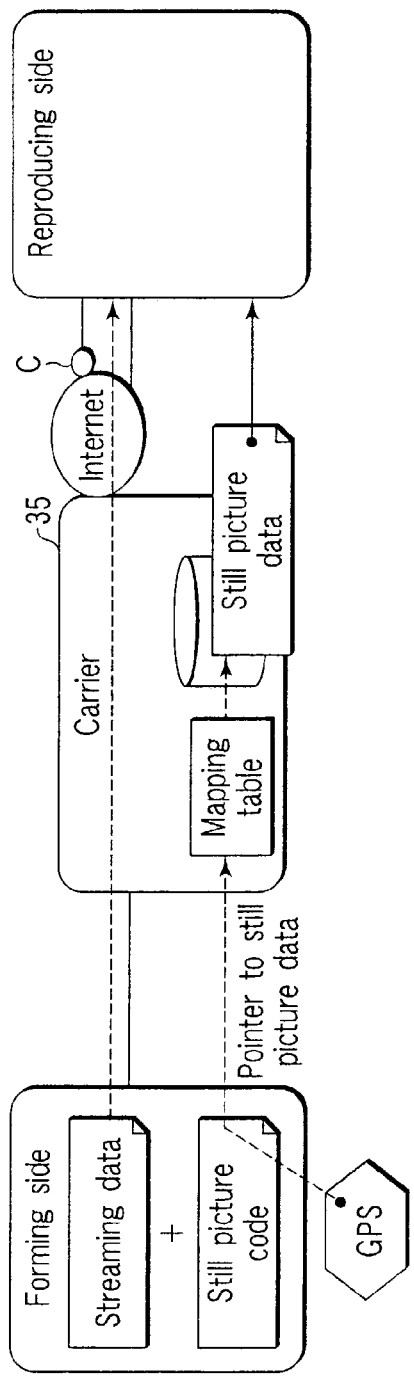
F I G. 15D
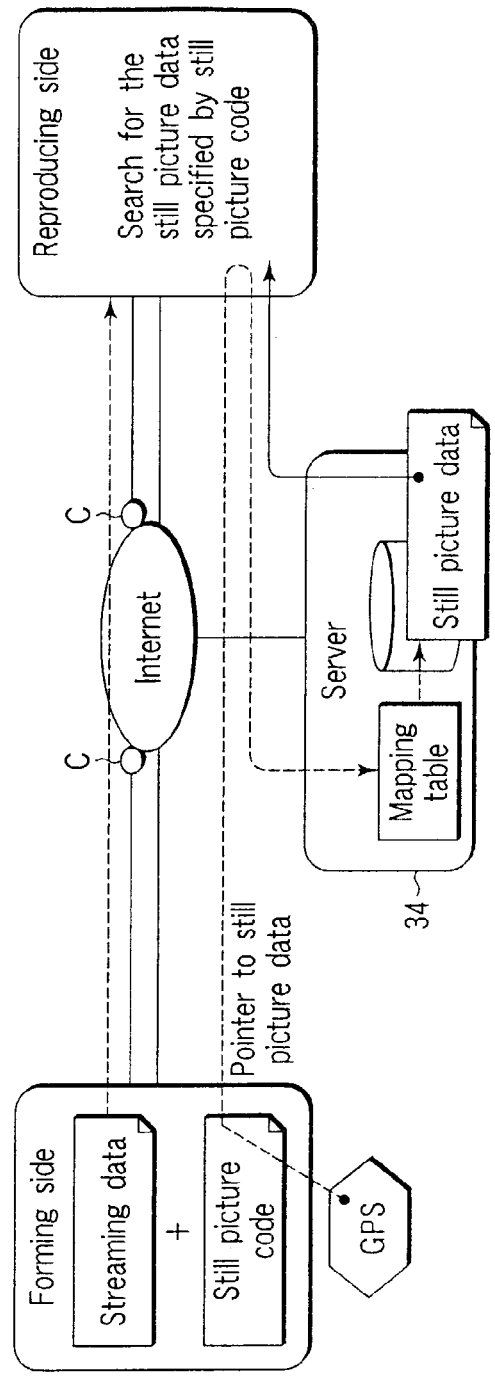
F I G. 15E

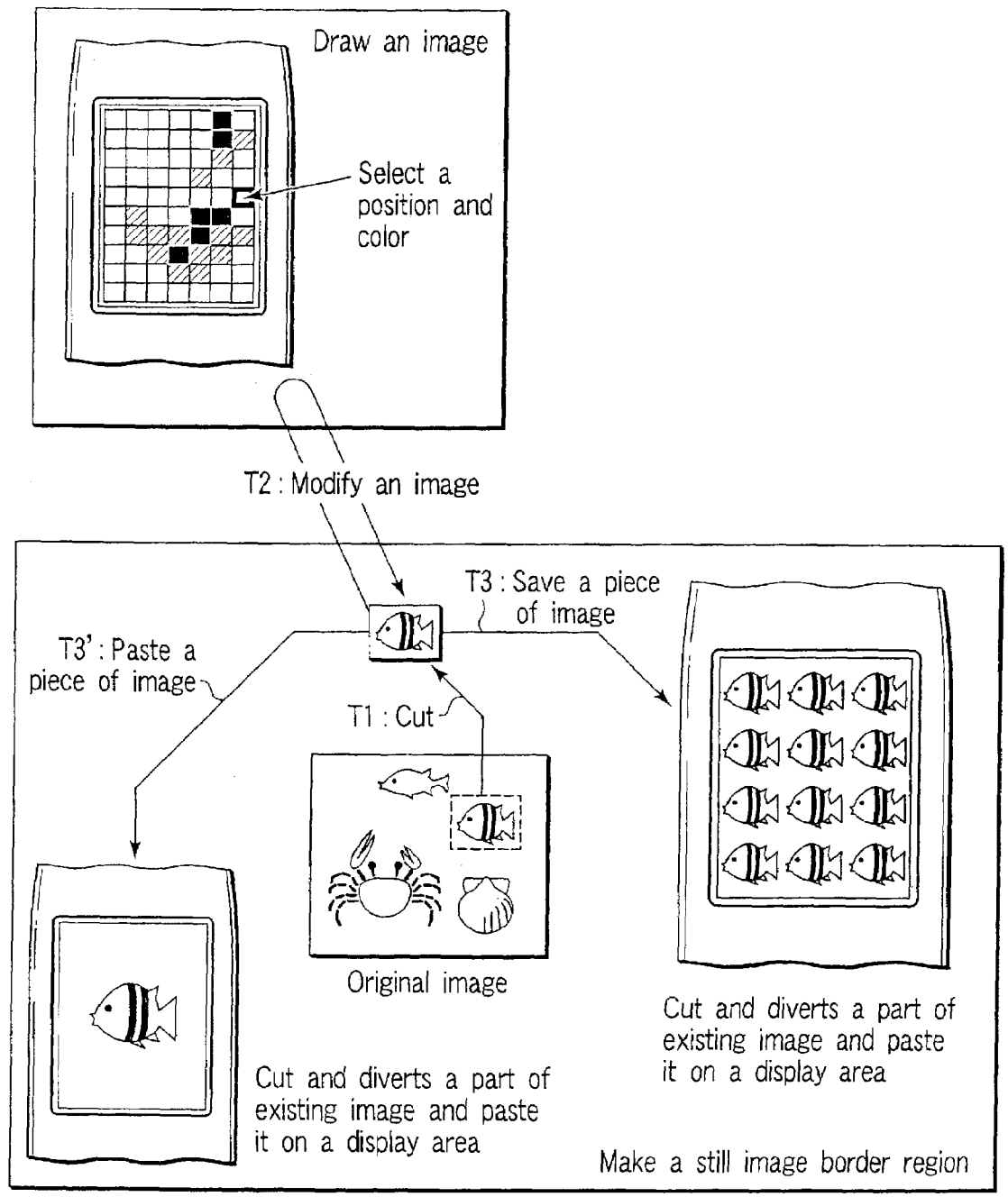
F I G. 17

INFORMATION APPARATUS, PICTURE DISPLAY METHOD, AND PICTURE TRANSMITTING METHOD

CROSS-REFERENCE TO RELATED APPLICATIONS

This application is based upon and claims the benefit of priority from the prior Japanese Patent Application No. 2002-127333, filed Apr. 26, 2002, the entire contents of which are incorporated herein by reference.

BACKGROUND OF THE INVENTION

1. Field of the Invention

The present invention relates to an information apparatus capable of forming a picture, an information apparatus capable of displaying a picture, a picture display method, and a picture transmitting method.

2. Description of the Related Art

In a case where streaming data (i.e., video data) is reproduced by use of a personal computer, for example, the user can select a desired picture from still pictures prepared by a streaming data reproducing application (i.e., Microsoft® Windows® Media Player®) and reproduce the streaming data by using the selected still picture as a background which surrounds the video produced by the streaming data.

On the other hand, with a mobile telephone, streaming data can be reproduced by use of the streaming data reproducing function thereof.

However, when the streaming data reproducing function of the mobile telephone is used, and if the size of the streaming data is smaller than the display portion of the mobile telephone, there occurs a problem that the streaming data which is displayed is surrounded by a still picture border consisting entirely of a single color. That is, in the streaming data reproducing operation of the mobile telephone, the displayed still picture, which corresponds to a blank portion lying around a reproducing portion of the streaming data, is not changed.

With a streaming data reproduction application (e.g., Windows® Media Player® 7.1) of the personal computer, it is possible to decorate the surrounding portion of the streaming data reproducing portion with a still picture that is called a skin. However, the still picture can be selected and displayed on the reproducing side and there occurs a problem that display of the still picture cannot be managed on the transmission side.

BRIEF SUMMARY OF THE INVENTION

Embodiments of the present invention provide an information apparatus, a picture display method and a picture transmitting method, capable of simultaneously displaying streaming data and still picture data, which corresponds to a blank portion lying around a reproducing portion of the streaming data, in a favorable state as expected or controlled by a user.

According to one aspect of the present invention, there is provided an information apparatus capable of forming a picture, comprising a data forming section configured to form a combination of streaming data and one of (1) still picture data and (2) a code used to obtain still picture data; and a data transferring section configured to transfer the formed combination of the streaming data and the one of (1) the still picture data and (2) the code to another apparatus.

According to another aspect of the present invention, there is provided an information apparatus, comprising a display screen; a data acquiring section configured to acquire streaming data and one of still picture data and a code used to obtain still picture data; and a data displaying section configured to simultaneously display the acquired streaming data and one of (1) the still picture data and (2) the still picture data obtained from the code on the display screen.

According to still another aspect of the present invention, there is provided a method of displaying a picture on an information apparatus, comprising transferring one of (1) first data items constituted by streaming data and still picture data, and (2) second data items constituted by streaming data and a code used to determine still picture data to the information apparatus; and simultaneously displaying one of (1) the transferred streaming data and still picture data, and (2) the streaming data and still picture data determined based on the code on a display screen of the information apparatus.

According to still another aspect of the present invention, there is provided a method of transmitting a picture from an information apparatus, comprising forming a combination of streaming data and one of still picture data and a code used to obtain still picture data; and transferring the formed combination of the streaming data and one of the still picture data and the code to another apparatus.

Additional embodiments and advantages of the invention will be set forth in the description which follows, and in part will be obvious from the description, or may be learned by practice of the invention. The embodiments and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 15A to 15E are diagrams illustrating various ways of transmitting data between the forming side and the reproducing side (when the GPS is used);

FIG. 17 is a view showing a method of forming the still picture data shown in FIG. 16E.

DETAILED DESCRIPTION OF THE INVENTION

Embodiments of the present invention will be described below with reference to the drawings.

In the embodiments of the present invention, a system is configured by two terminals respectively provided on a sending or transmitting side (which is hereinafter referred to as a forming side) which forms streaming data and still picture data and on a receiving or reproducing side (which is hereinafter referred to as a reproducing side) which simultaneously reproduces the thus formed streaming data and still picture data, and a function of transferring data between the two terminals.

However, there is a case in which the terminals of the forming side and the reproducing side are the same, and in this case, the function of transferring data is provided inside the terminal.

Further, the terminal has a function of combining streaming data and still picture data and a function of simultaneously displaying the streaming data and the still picture data.

The term "terminal" used in this case indicates an information apparatus capable of reproducing streaming data and still picture data and a mobile telephone, personal digital assistant (PDA), personal computer and the like can be used as the terminal.

Generally, transmitting between the forming side and the reproducing side is done by wireless communication; but it could be done by hard wire (including optical) communication or by a combination of wireless and hard wire (including optical) communication.

Figure 1:
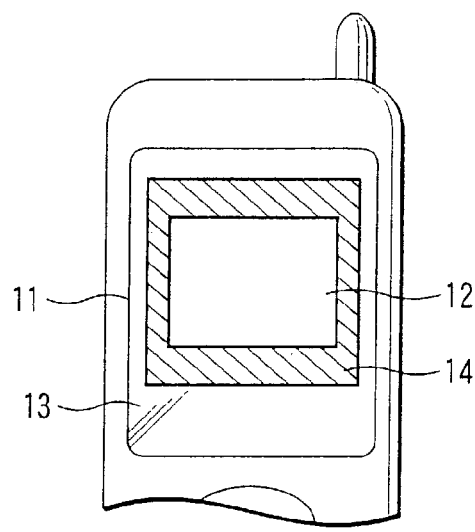
FIG. 1 is a view for illustrating the relationship between still picture data and streaming data that are simultaneously displayed on an information apparatus according to one embodiment of the invention.

The still picture data, corresponds to the blank portion of streaming data which surrounds the video of the streaming data in the usual case where the video of the streaming data is displayed on an area smaller than the available display area of the receiving terminal. FIG. 1 illustrates a blank portion 13 of a streaming data reproducing portion 12 and a display portion 11 of a terminal (i.e., mobile phone). In this case, a still picture data display portion 14 may occupy only part of the blank portion 13 or occupy the entire portion of the blank portion 13.

Generally, there are two methods of transferring streaming data and still picture data from a forming side to a reproducing side. The first involves a method of transferring streaming data together with still picture data and a method of transferring a code (to which an ID used to identify a server or storage medium in which still picture data is stored is also attached) indicating the still picture data and streaming data are provided.

Figure 2:
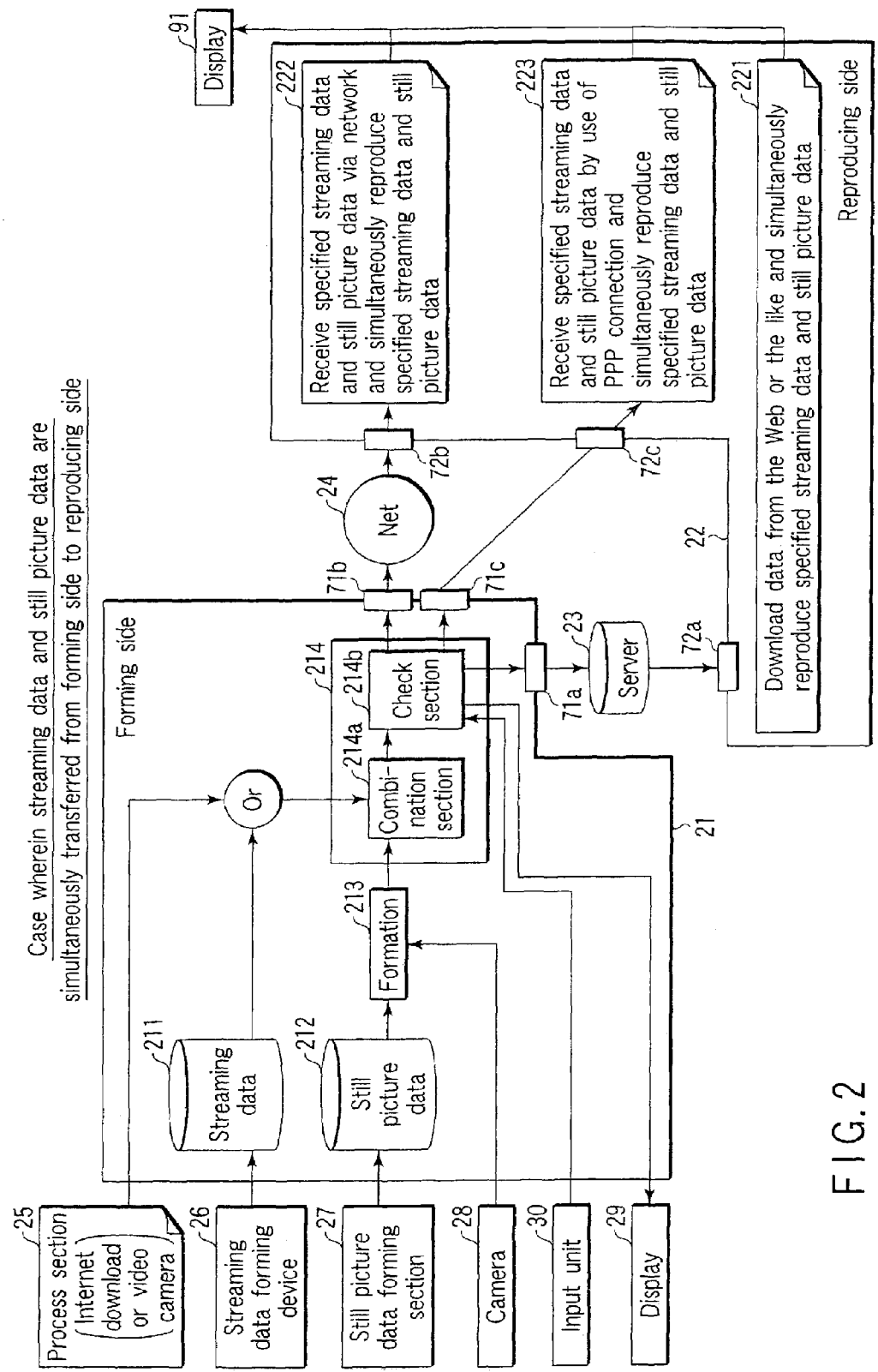
FIG. 2 is a diagram for illustrating an example in which streaming data and still picture data are transferred together from a forming side to a reproducing side.

Example in Which Streaming Data and Still Picture Data are Transferred Together from Forming Side to Reproducing Side FIG. 2 is a diagram for illustrating an example in which streaming data and still picture data are transferred together from the forming side to the reproducing side.

As shown in FIG. 2, a forming side 21 has a processing section 214 including a combination section 214a that combines streaming data (which the user, here being the transmitting user, wants to reproduce) in a streaming data storage section 211 with still picture data (which the transmitting user wants to reproduce) in a still picture data storage section 212, and further including a check section 214b that executes a check on the data combination (which will be described in detail later). After the checking, a transmitting process is executed by any one of the transmitting section 71a to 71c.

The processing section 214 may be implemented using a programmed digital signal processing unit such as a microprocessor with a stored program.

With regard to the still picture data, it is possible to use either the still picture data already stored in the still picture data storage section 212 or still picture data which is newly formed by a still picture data forming section 27. In the later case, the newly formed still picture data is stored in and subsequently retrieved from the still picture data storage section 212. The still picture data forming section 27 is equivalent to an electronic apparatus, such as a computer, digital camera or a mobile telephone, which is connected to the forming side 21 either directly or via a wired or wireless network. The still picture data forming section 27 may also be equivalent to a storage medium, such as a memory card, which can be connected to and removed from the forming side 21. A digital camera 28 is mounted to the forming side 21. The user may take still pictures, such as scenery pictures, with the camera 28. The still picture data generated by the camera 28 may be used. In the still picture data forming section 213, still picture data to be sent to the processing section 214 is formed using the still picture data stored in the storage section 212 or using still picture data obtained from the camera 28.

The still picture data to be combined with the streaming data can be replaced by the still picture code that identifies the still picture data. In this case, the reproducing side 22 or any other apparatus must acquire the still picture data identified by the still picture code.

For the streaming data, one may use the streaming data already stored in the streaming data storage section 211. Alternatively, the streaming data may be used by retrieved from a streaming data storage section 211 which stores streaming data from a streaming data forming device 26. The streaming data forming device 26 is equivalent to an electronic apparatus, such as a computer, a video camera or a mobile telephone, which is connected to the forming side 21 either directly or via a wired or wireless network. The streaming data forming device 26 may also be equivalent to a storage medium, such as a memory card, which can be connected to and removed from the forming side 21. Alternatively, the streaming data may be one that a process section 25 has down-loaded from, for example, an Internet site that provides various streaming data items. The process section 25 may also be equivalent to a video camera. Streaming data taken using the video camera may be used.

The still picture data may have information that represents the display position of the streaming data (combined with the still picture data) to be displayed on the still picture data. Alternatively, the streaming data may have such information.

Figure 3:
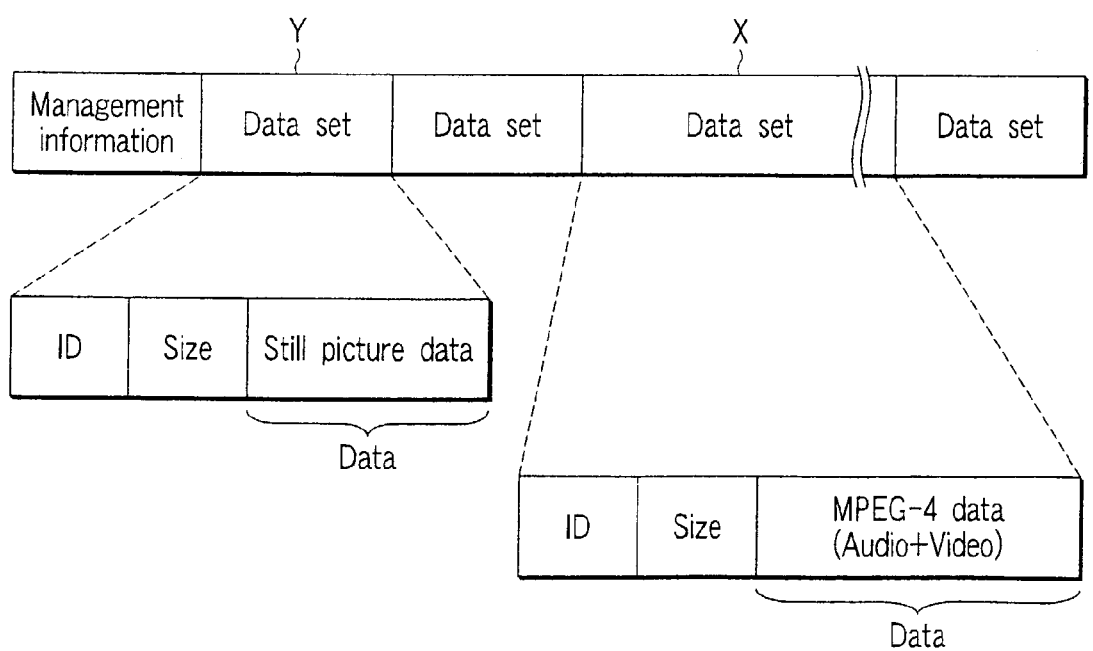
FIG. 3 depicts a file format of a file that contains streaming data and still picture data.

FIG. 3 depicts a file format of a file that contains both the streaming data and the still picture data. Both the streaming data and the still picture data are stored into a file. A file format of the file is based on, e.g., MP4. The file format shown in FIG. 3 has a "management information" area and some "data set" (also called "box")" areas. Each data set has areas labeled "identifier," "size," "data" and the like. The "management information" need not always be at the head of the file format.

In the file format described above, the streaming data is contained in a "data" area of a data set X. The streaming data is compressed in the MPEG-4 format. The streaming data may include video data only. Nonetheless, it may include a combination of video data and audio data. The still picture data is contained in a "data" area of a data set Y. The still picture data may be replaced by the still picture code that identifies the still picture data. If so, the still picture code is contained in the "data" area.

The "management information" may contain information representing that, in reproduction, display position of the streaming data on the still picture data is to be specified on a screen and the streaming data is to be displayed on the specified display position.

It is desired that the "management information" contain information representing the positions of the streaming data and the still picture data in the file format. If the management information contains this information, it is easy to determine where the streaming data and the still picture data are positioned in the file format, when these data items are reproduced.

The check section 214b has a function of determining whether the streaming data and the still picture data are combined in an appropriate state after they have been included into the file. For example, it is determined whether the streaming data can be displayed at a desired position on the still picture, e.g., a center of the still picture. This function is performed in two steps. In the first step (1), it is determined by the check section 214b as to whether the streaming data and the still picture data, combined together, comply with the file format on a file, and whether the file complies with the communication protocol. In the second step (2), the streaming data and the still picture data, combined together, are displayed on the screen of the display section 29 provided in the forming side 21, enabling the user to confirm whether the combination of picture data items is exactly what he or she wants (e.g., whether the streaming data is positioned at a center of the still picture). In this case, information including, e.g., "OK" or "NG" specified using the input unit 30 by a user is received by the checking section 214b. The checking section 214b can instruct any one of the transmitting section 71a to 71c to transmit the file containing the streaming data and the still picture data after it is determined that these data items are combined in an appropriate state.

Figure 4:
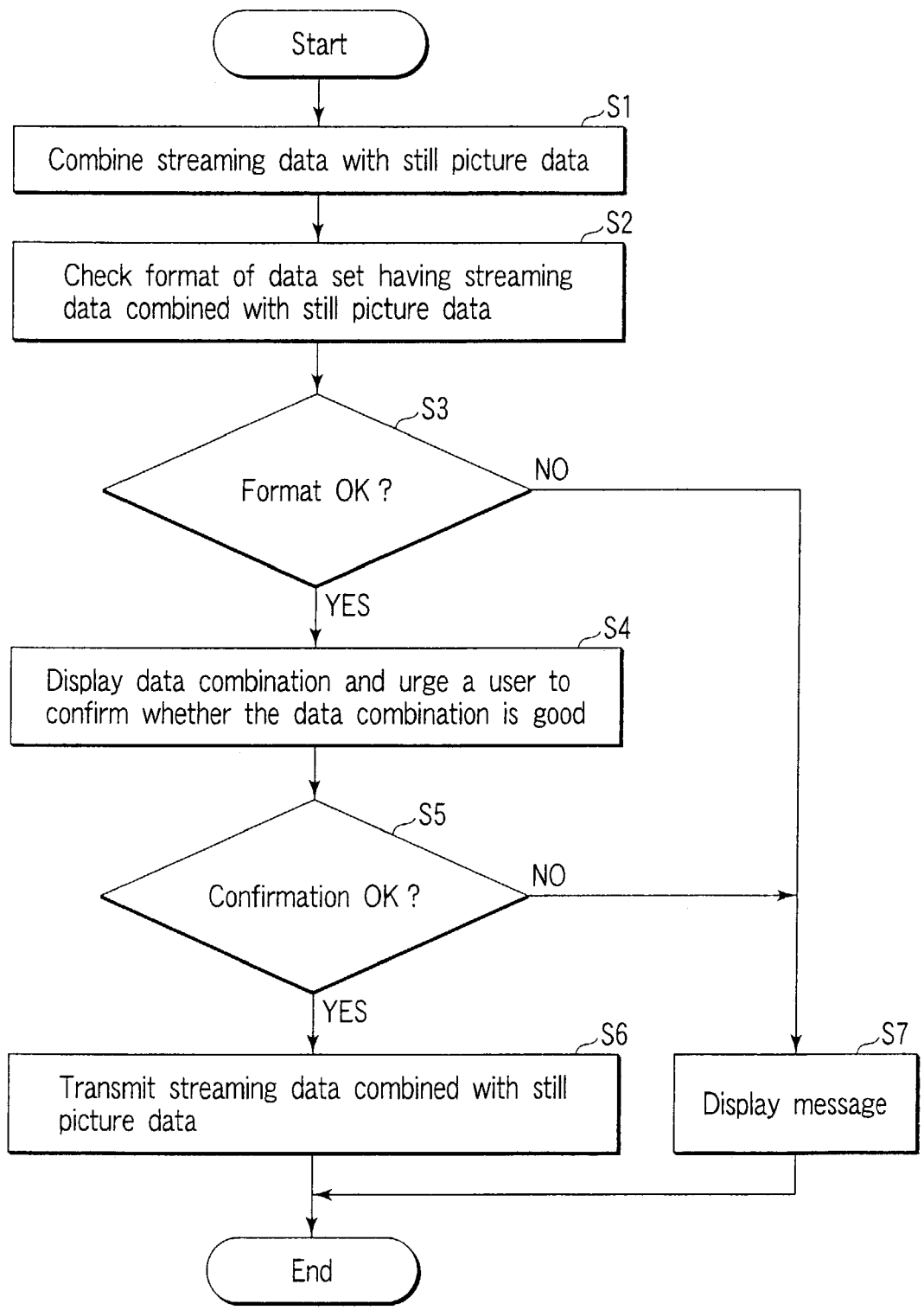
FIG. 4 is a flowchart for explaining the operation of the processing section 214 shown in FIG. 2.

How the processing section 214 shown in FIG. 2 operates will be described, with reference to FIG. 4.

The combination section 214a combines the streaming data and the still picture data and stores them into one file (Step S1). The check section 214b determines whether the data sets, i.e., the combination of the streaming data and still picture data, comply with the file format (and whether the file complies with the communication format) (Step S2).

If the data set complies with the file/communication formats (if Yes in Step S3), the check section 214b causes the display section 29 to display the streaming data and the still picture data on a screen of the display section 29 (Step S4), enabling the user to confirm whether these pictures are combined as he or she desires. (For example, the section 214b asks the user to select "OK" or "NG" displayed on a screen of the display section 29.)

If the user selects "OK" (Step S5), the section 214b instructs any one of the transmitting sections 71a to 71c to transmit the file containing the streaming data and the still picture data (Step S6).

If the data set does not comply with the file format (if No in Step S2), the processing section 412 causes the displays section 29 to display a message (e.g., an error message) (Step S7). Before the section 29 displays the message, Steps S1 and S2 may be tried again.

If the user does not select "OK" in Step S5 (if No in Step S5), the section 214 causes the display section 29 to display a message (e.g., a message asking the user to change the combination of images). The user interface and operations to select streaming and still picture data are explained below.

For example, at the time of displaying a message asking the user to change the combination of images, the section 214 may also causes the display section 29 to display a selection menu on which selectable streaming data items and still picture data items to be combined are lined up. By viewing the selection menu, the user can select a desired streaming data item and a desired still picture data item to be combined using the input unit 30. When the selecting operation by the user is completed, the selection 214 again executes the processing shown in FIG. 4 from Step S1.

Since two types of checking procedures are carried out, the data set, i.e., the combination of the streaming data and still picture data, can be transmitted in a state complying with the file format and being desirable to the user, from the forming side 21 to the reproducing side 22 directly or via a Web server 23 or a network 24 such as the Internet.

On the reproducing side 22, three general types of data transmission structures are envisioned: (1) the operation of downloading and reproducing the combined data of streaming data and still picture data stored in a Web server 23 or the like by use of a processing section 221, (2) the operation of reproducing the combined data of streaming data and still picture data received by e-mail or the like via a network 24 such as the Internet by use of a processing section 222, and (3) the operation of reproducing the combined data of streaming data and still picture data received by PPP (Point to Point Protocol) connection made by using Bluetooth™ or the like by use of a processing section 223. Each receiving process is executed by any one of receiving sections 72a to 72c. The combined data reproduced by any one of the processing sections 221 to 223 is displayed on a screen of a display section 91.

Figure 5:
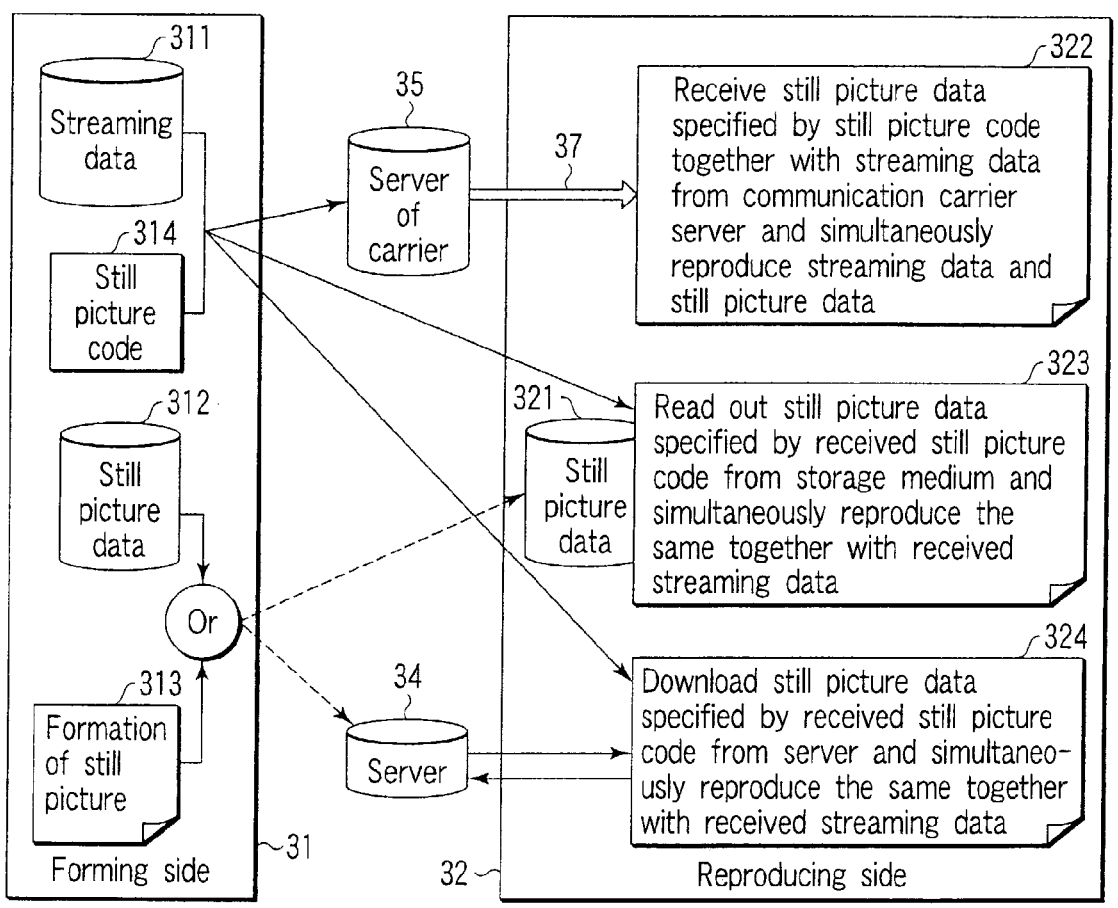
FIG. 5 is a diagram for illustrating an example in which streaming data and still picture data are transferred separately.

Example in Which Streaming Data and Still Picture Data Are Separately Transferred FIG. 5 is a diagram for illustrating an example in which streaming data and still picture data are separately transferred.

A forming side 31 combines a still picture code (configured by approximately 16 bits at most) which is provided in a still picture code holding section 314 and specifies still picture data (which the user wants to use at the time of reproducing the streaming data) with streaming data provided in a streaming data storage section 311 and transmits the combined data to a reproducing side 32 (or transmits the combined data to a server 35 of a communication carrier). The reproducing side 32 simultaneously reproduces streaming data and still picture data corresponding to the still picture code.

In general, there are three possible ways in which it is envisioned that the still picture data can be reproduced on the reproducing side: (1) a case wherein still picture data that is stored in the communication carrier server 35 is used, (2) a case wherein still picture data stored in a still picture data storage section (which is a storage medium such as a memory or SD card) 321 provided on the reproducing side 32 is used, and (3) a case wherein still picture data stored in a server 34 connected to a network provided by a third party is used.

The above three cases are explained below.

(1) A case wherein still picture data stored in the communication carrier server 35 is used.

The forming side 31 transmits a still picture code which specifies still picture data held in the communication carrier server 35 and its own streaming data provided in the streaming data storage section 311 to the communication carrier server 35. The communication carrier server 35 retrieves the still picture data specified by the still picture code from the server and transmits the retrieved data together with the streaming data transmitted from the forming side 31 to the reproducing side 32 via a path 37. In a processing section 322 of the reproducing side 32, the received streaming data and still picture data are simultaneously reproduced.

(2) A case wherein still picture data stored in the still picture data storage section 321 provided on the reproducing side 32 is used.

The still picture data stored in the still picture data storage section 321 is data which is obtained when the forming side 31 previously transmits still picture data in the still picture data storage section 312 or still picture data newly formed in a still picture data forming section 313 to the reproducing side 32 and stores the data therein or data which already exists in the still picture data storage section 321. The forming side 31 transmits a still picture code (to which an ID used to identify the storage section 321 is also attached) which is held in the still picture code holding section 314 and specifies still picture data stored in the still picture data storage section 321. The forming side 31 also transmits streaming data in the streaming data storage section 311 to the reproducing side 32. In a processing section 323 of the reproducing side 32, still picture data specified by the received still picture code is read out from the still picture data storage section 321 and the readout still picture data and received streaming data are simultaneously reproduced.

(3) A case wherein still picture data stored in the server 34 connected to a network provided by a third party is used.

Still picture data in the server 34 is data which is obtained when the forming side 31 previously transmits still picture data in the still picture data storage section 312 or still picture data newly formed in the still picture data forming section 313 to the server 34 and stores the data therein or data which already exists in the server 34. The forming side 31 transmits a still picture code (to which an ID used to identify the server 34 is also attached) which is held in the still picture code holding section 314 and specifies still picture data stored in the server 34. The forming side 31 also transmits the streaming data in the streaming data storage section 311 to the reproducing side 32. A processing section 324 of the reproducing side 32 requests the server 34 to transmit still picture data specified by the received still picture code thereto and simultaneously reproduces still picture data received from the server 34 and received streaming data.

When the still picture code is transferred to the reproducing side 32 and if still picture data specified by the still picture code cannot be obtained from a corresponding storage medium, still picture data which was separately prepared can be used as a substitute to combine with streaming data.

The still picture data forming section 213 (313) of the forming side 21 (31) can provide the following functions when still picture data is formed:

the function of determining a desired range based on the existing still picture data to form still picture data;

the function of specifying a desired range on the existing still picture data and freely specifying positions (according to a locus or the like of a cursor or mouse) with respect to solid color within the specified range so as to form still picture data;

the function of preparing several types of a plurality of existing still pictures (such as small pictures), using the still pictures as parts of a still picture to be formed and adequately combining the parts to form still picture data; and the function of repeatedly developing (arranging a plurality of pictures which are the same picture) several types of a plurality of existing still pictures (such as small pictures) to form still picture data.

By using the above functions, for example, a plurality of existing still picture data items which are smaller than the still picture data to be displayed can be transferred from the forming side to the reproducing side, the plurality of existing still picture data items which have been previously transferred to the reproducing side can be displayed on the display screen of the reproducing side and streaming data can be displayed while it is superposed on the still picture data.

Further, by using the various functions described above, images (still picture data and streaming data which are simultaneously reproduced) as shown in FIGS. 16A to 16F can be displayed on the screen of the terminal (in the case of a mobile telephone) on the reproducing side.

Figure 16A:
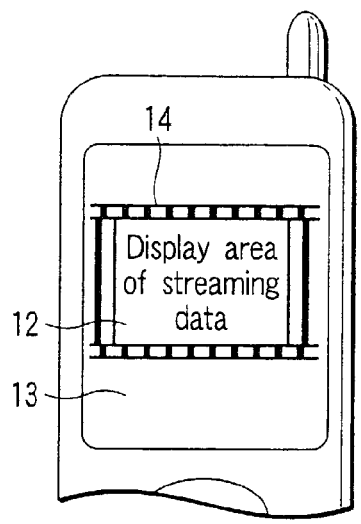
FIGS. 16A to 16F are views showing examples of images displayed on the screen of a terminal (in the case of the mobile telephone) on the reproducing side.
Figure 16B:
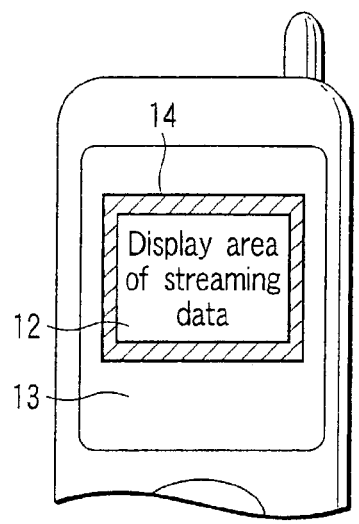

In FIGS. 16A and 16B, still picture data is displayed on part 14 of the blank portion 13 and streaming data is displayed to fit a portion 12 defined by the still picture data.

Figure 16C:
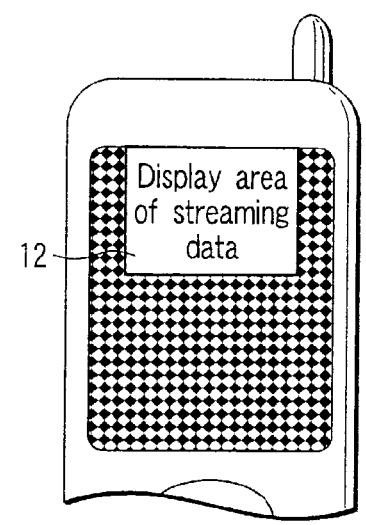
Figure 16D:
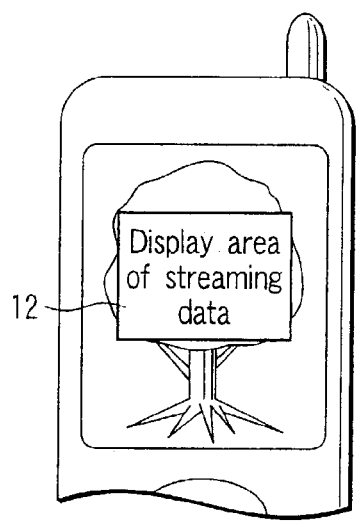
Figure 16E:
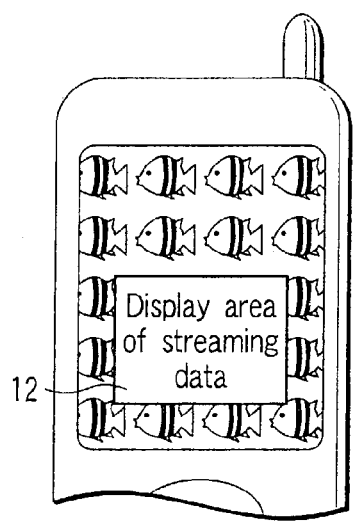

In FIGS. 16C and 16E, small still picture patterns are displayed on the entire portion of the blank portion and streaming data is superposed on part of the small still picture patterns.

Figure 16F:
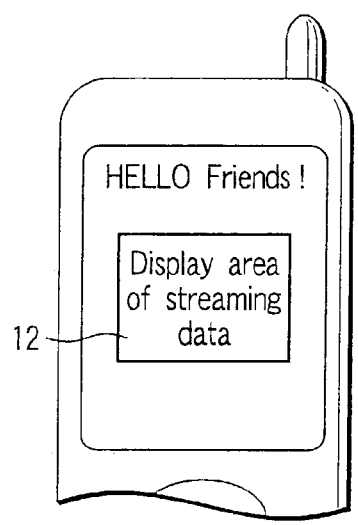

In FIGS. 16D and 16F, still picture data is displayed on the entire portion of the blank portion and streaming data is superposed on part of the still picture data.

A method of forming the still picture data shown in FIG. 16E will be described, with reference to FIG. 17.

To form the still picture data, the user uses a pointing device (e.g., a cursor key or a pen). In this case, the forming-side apparatus may be the mobile telephone shown in FIG. 18A or the PDA shown in FIG. 18B. The forming-side apparatus incorporates a tool for forming still picture data. The still picture data forming function including such a tool corresponds to, e.g., the still picture data forming section 213 (or the still picture data forming unit 27) shown in FIG. 2 or the still picture data forming section 313 shown in FIG. 5.

First, an original image to be used to form the still picture data is displayed on the display screen of the apparatus. A selected image part (e.g., an image of a fish) of the original image is cut out (Step T1).

Then, operations are carried out, editing (e.g., coloring) the data representing the selected original image (Step T2). More precisely, the following steps are performed in sequence:

1. activate the still-picture forming tool;
2. select color for the still picture;
3. designate the cell to be painted, by using the pointing device (e.g., a cursor key of a mobile telephone shown in FIG. 18A or a pen of the PDA shown in FIG. 18B);
4. paint the cell;
5. repeat the above operations 1 to 3 for each cell; and
6. save the image edited.

Figure 18A:
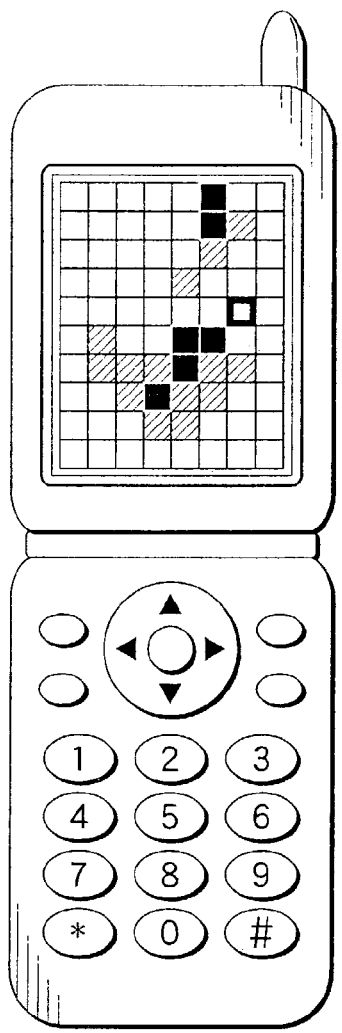
FIGS. 18A and 18B show apparatuses that can be used to form still picture data.
Figure 18B:
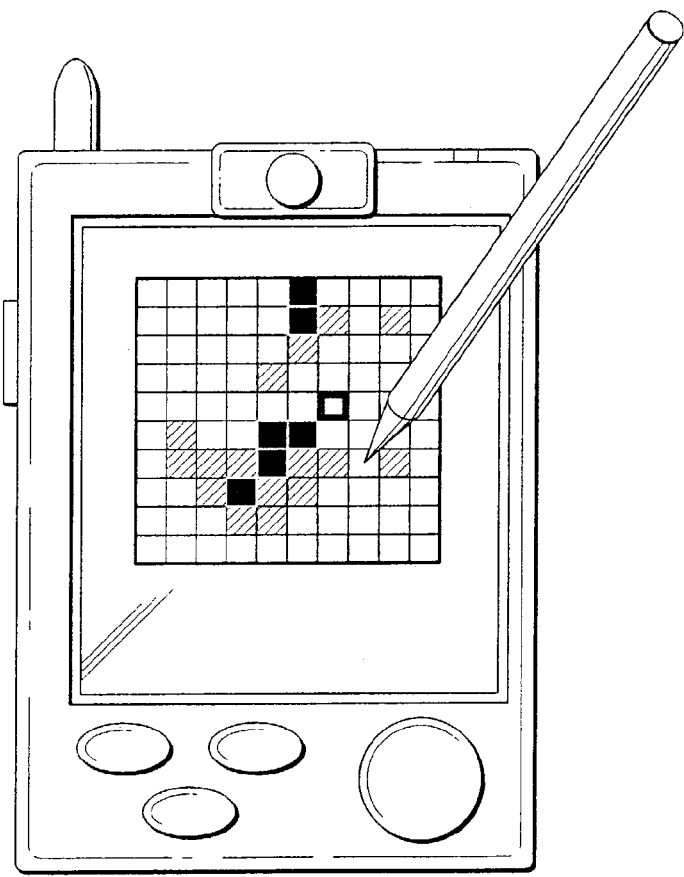

To perform these steps, the user may use the mobile telephone shown in FIG. 18A or the PDA shown in FIG. 18B. If the PDA is used, the user may manipulate the pen to edit the image by hand writing.

Thereafter, the user copies the edited image, and paste the identical images at prescribed intervals on the display screen (Step T3). Thus, the user can form a desirable still picture data by repeatedly using an image selected from the original images.

The image edited may not be copied, obtaining a number of identical images. Instead, the user may only paste the edited image, thus forming still picture data (Step T3').

Further, in the present embodiment, adequate still picture data which is suitable for a location in which the terminal exists can be automatically selected by utilizing a function of acquiring positional information by use of a global positioning system (GPS) or the like. In this case, automatically selected still picture data and moving data are simultaneously reproduced.

Various examples in which the GPS function is used are explained below.

Figure 10:
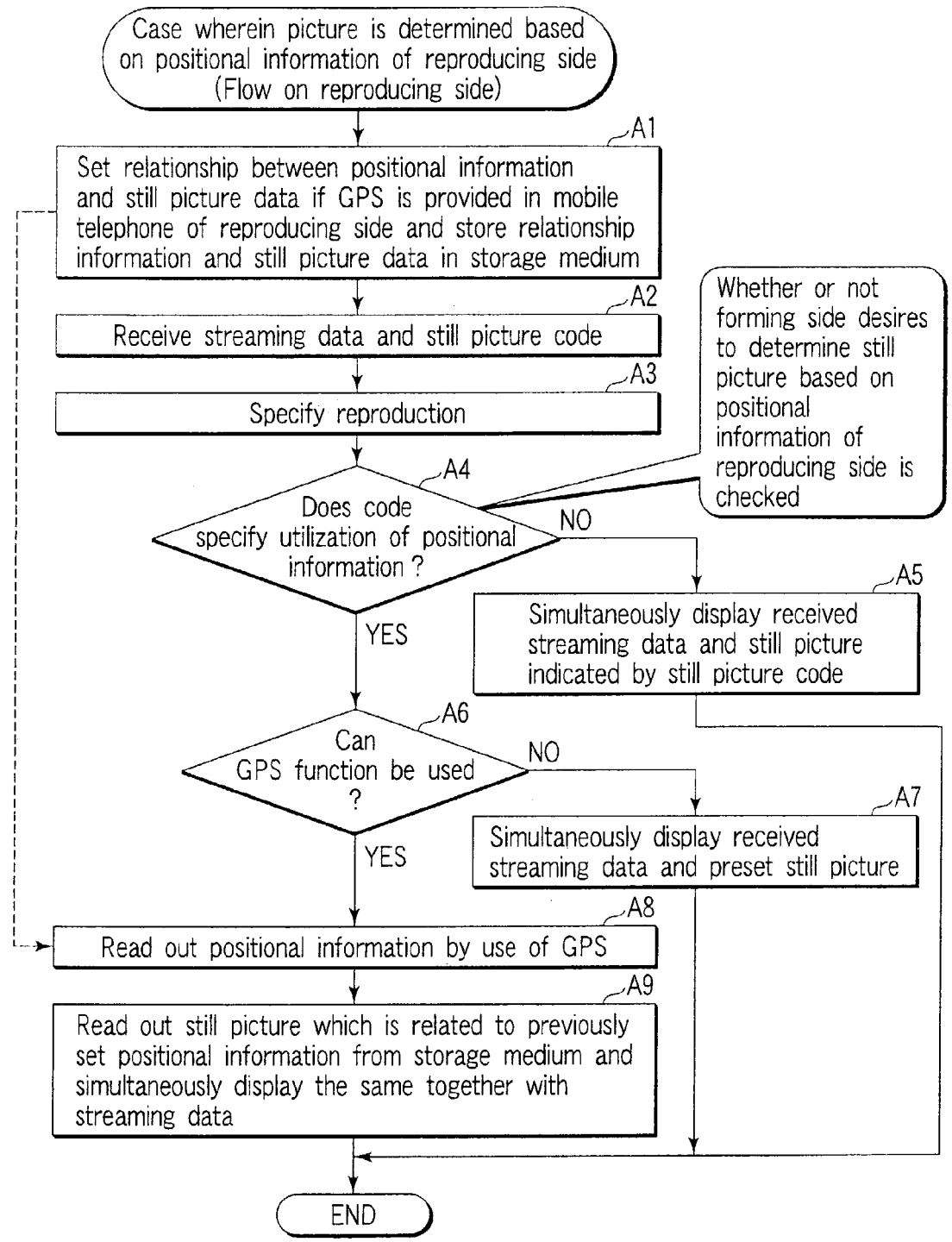
FIG. 10 is a flowchart for illustrating the operation on the reproducing side when a picture is determined based on positional information on the reproducing side.

Case Wherein Still Picture Data is Determined Based on Positional Information on Reproducing Side A case wherein still picture data is determined based on positional information on the reproducing side is explained with reference to FIGS. 6 and 10.

Figures 6, 7:
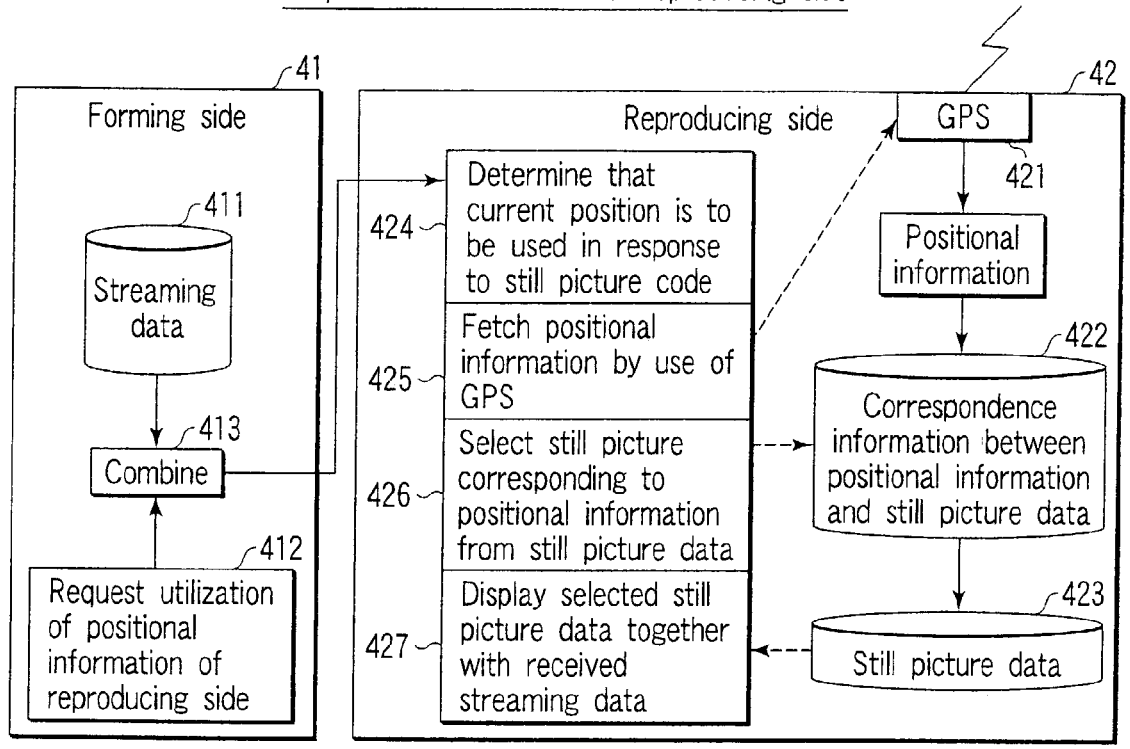
FIG. 6 is a diagram for illustrating an example in which still picture data is determined based on positional information on the reproducing side.
FIG. 7 is a diagram showing information that defines the correspondence relationship between positional information and still picture data.

As shown in FIG. 6, a forming side 41 combines streaming data in a streaming data storage section 411 with a still picture code (which is stored in a still picture code storage section 412 and makes a request that positional information acquired on a reproducing side 42 be utilized) in a processing section 413, and transmits the combined data to the reproducing side 42.

As shown in FIG. 7, a correspondence information storage section 422 provided on the reproducing side 42, stores an information (table) in which items (position, range, still picture file name, remark) which define the correspondence relationship between positional information and still picture data are described.

On the reproducing side 42, it is determined in a processing section 424 that positional information of the current position is to be used in response to the request of the received still picture code and positional information is acquired by use of a GPS function 421 in a processing section 425. In a processing section 426, still picture data corresponding to the acquired positional information is selected from information in the correspondence information storage section 422. Further, in a processing section 427, the selected still picture data is read out from the still picture data storage section 423 and the readout still picture data and received streaming data are displayed together.

The processing sections 424, 425, 426 and 427 may be implemented using a programmed digital signal processing unit such as a microprocessor with a stored program.

Next, the operation of the reproducing side performed in a case wherein a picture is determined based on positional information on the reproducing side is explained with reference to FIG. 10.

First, if a GPS function is provided in a terminal (which is a mobile telephone, for example) of the reproducing side 42, the relationship between positional information and still picture data is set and the relationship information and still picture data are previously stored in a storage medium (on the reproducing side 42) (step A1).

When the reproducing side 42 receives streaming data and a still picture code from the forming side 41 (step A2), it issues commands for effecting the specification for reproducing the still picture data (step A3).

In this case, whether or not the received still picture code indicates utilization of positional information is checked (step A4). If it does not indicate utilization of positional information, the received streaming data and still picture data indicated by the still picture code are simultaneously displayed (step A5). If the received still picture code indicates utilization of positional information, whether or not the GPS function can be used (i.e., GPS satellite signal available and GPS functioning properly) is determined (step A6). If the GPS function cannot be used, the received streaming data and preset still picture data are simultaneously displayed (step A7). If the GPS function can be used, positional information is read out by use of the GPS function (step A8).

Still picture data which is related to the readout positional information is selected by referring to the relationship information previously stored in the storage medium and the selected still picture data and streaming data are simultaneously displayed (step A9).

Next, a case wherein still picture data is determined based on positional information on the forming side is explained. At this time, there are two cases including (1) a case wherein still picture data is transmitted from the forming side to the reproducing side and (2) a case wherein positional information on the forming side is transmitted as part of a still picture code to the reproducing side.

The respective cases are explained below.

Figure 11:
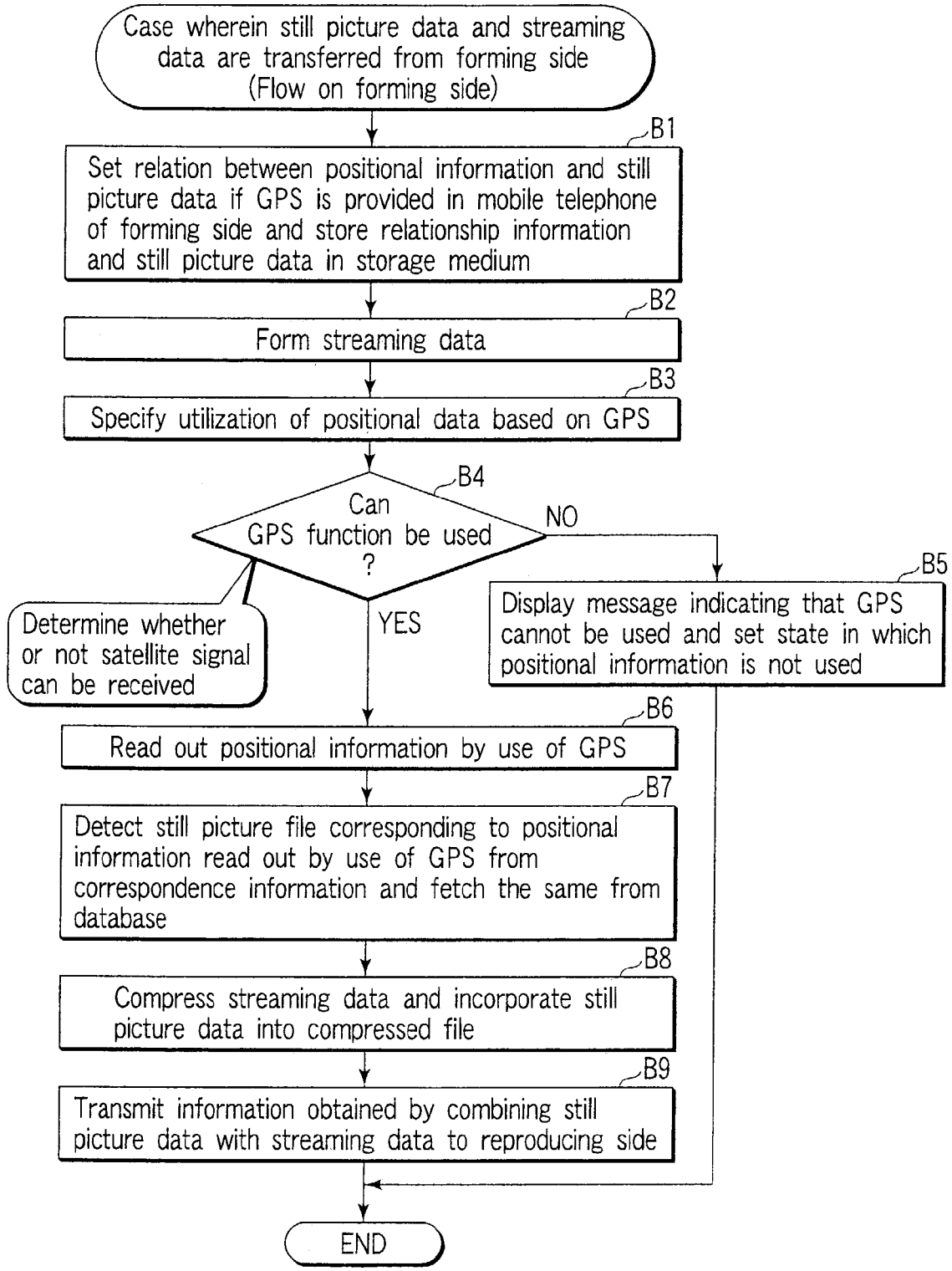
FIG. 11 is a flowchart for illustrating the operation on the forming side when still picture data and streaming data are transferred from the forming side.

Case Wherein Streaming Data and Still Picture Data Are Transmitted from Forming Side A case wherein streaming data and still picture data are transmitted from the forming side is explained with reference to FIGS. 8 and 11.

Figure 8:
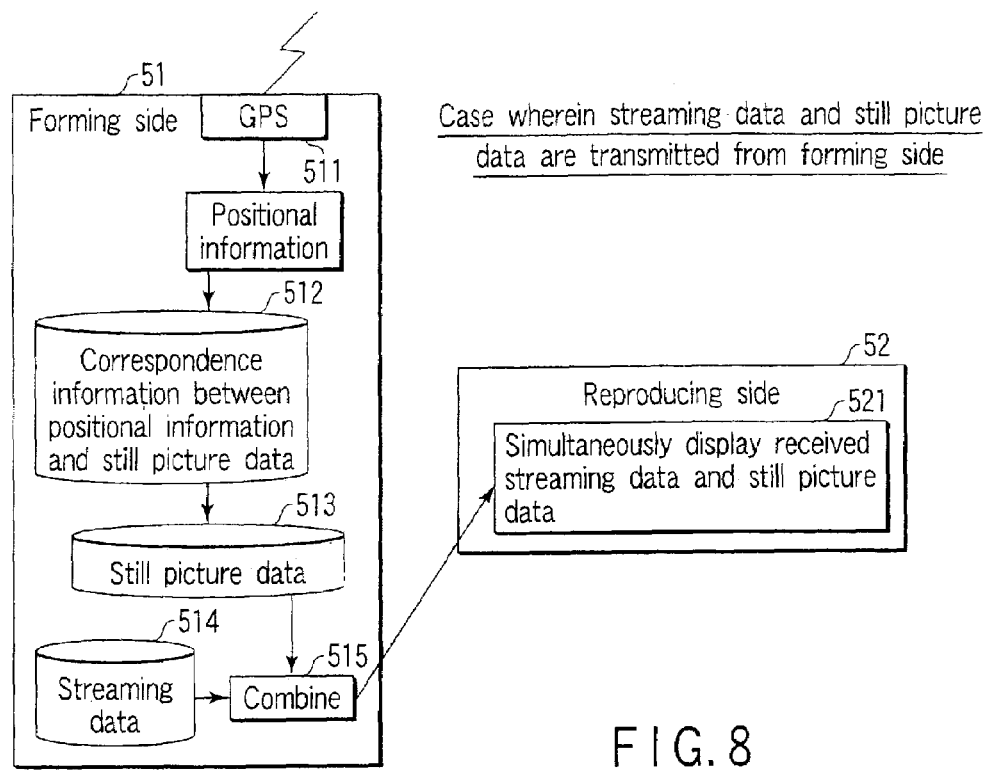
FIG. 8 is a diagram for illustrating an example in which streaming data and still picture data are transferred from the forming side.

As shown in FIG. 8, a correspondence information storage section 512 provided on a forming side 51, stores an information (table) (such as shown in FIG. 7) in which items (position, range, still picture file name, remark) which define the correspondence relationship between positional information and still picture data are described.

The forming side 51 acquires positional information by use of a GPS function 511 and selects still picture data corresponding to the acquired positional information from information in the correspondence information storage section 512. Further, it reads out the selected still picture data from the still picture data storage section 513, combines the readout still picture data in a combiner 515 with streaming data in a streaming data storage section 514 and transmits the combined data to a reproducing side 52.

The reproducing side 52 simultaneously displays the received streaming data and still picture data in a reproducing section 521.

Next, the operation on the forming side performed in a case wherein still picture data and streaming data are transmitted from the forming side is explained with reference to FIG. 11.

First, if a GPS function is provided in a terminal (which is a mobile telephone, for example) of the forming side 51, the relationship between positional information and still picture data is set and the relationship information and still picture data are previously stored in a storage medium (on the forming side 51) (step B1). On the reproducing side 52, streaming data is formed (step B2).

On the forming side 51, utilization of positional information based on the GPS function is specified (step B3).

At this time, whether or not the GPS function can be used is determined (step B4). If the GPS function cannot be used, a message indicating that the GPS function cannot be used is displayed, a state in which positional information is not used is set (step B5) and then a corresponding process is performed. If the GPS function can be used, positional information is read out by use of the GPS function (step B6).

Still picture data which is related to the readout positional information is selected by referring to the relationship information previously stored in the storage medium and the selected still picture data (still picture file) is fetched from the database (step B7).

On the other hand, streaming data is compressed and the still picture data is incorporated into a compressed file (step B8).

Thus, information obtained by combining still picture data with streaming data is transmitted to the reproducing side 52 (step B9).

Figure 12:
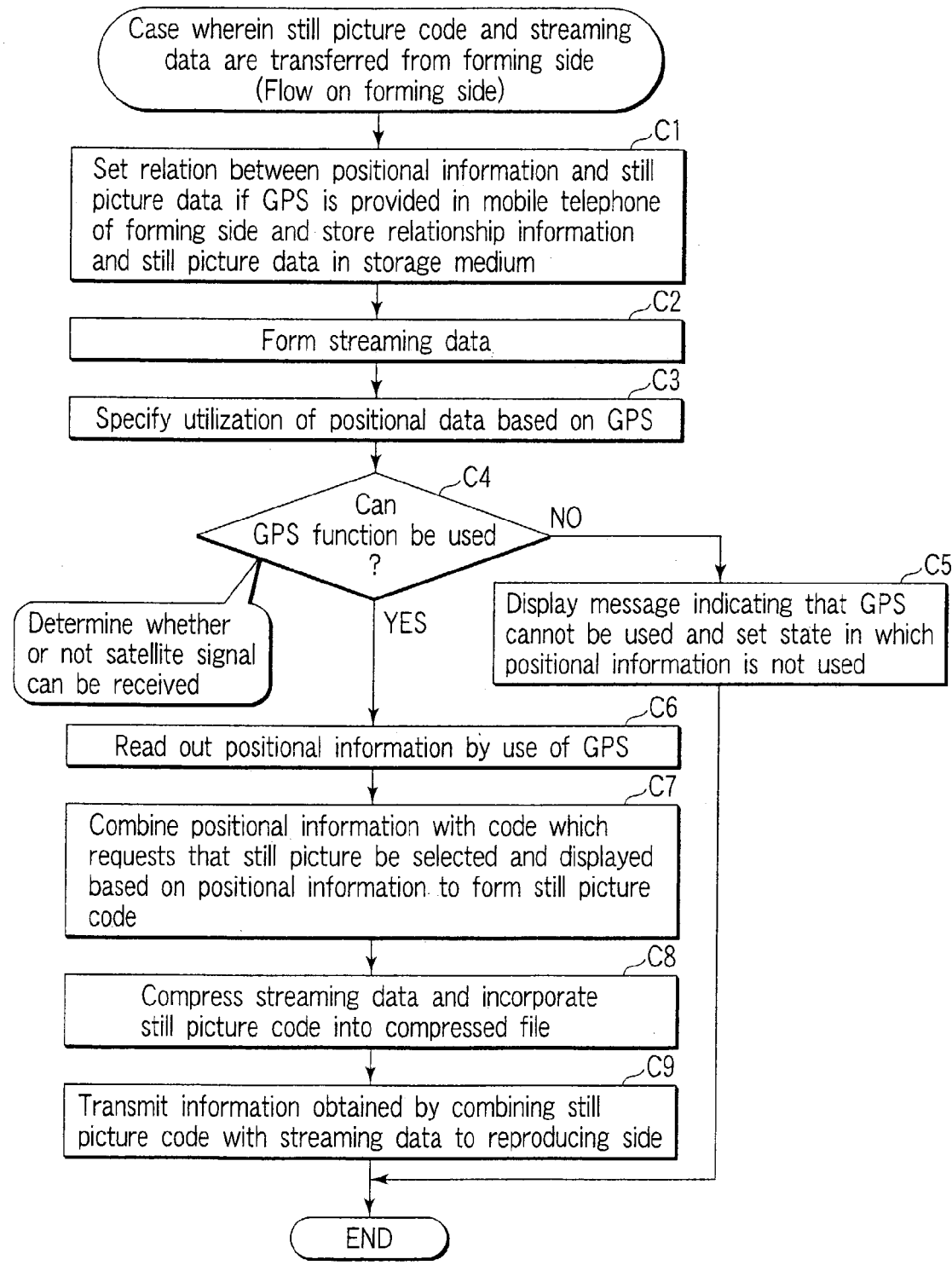
FIG. 12 is a flowchart for illustrating the operation on the forming side when a still picture code and streaming data are transferred from the forming side.
Figure 13:
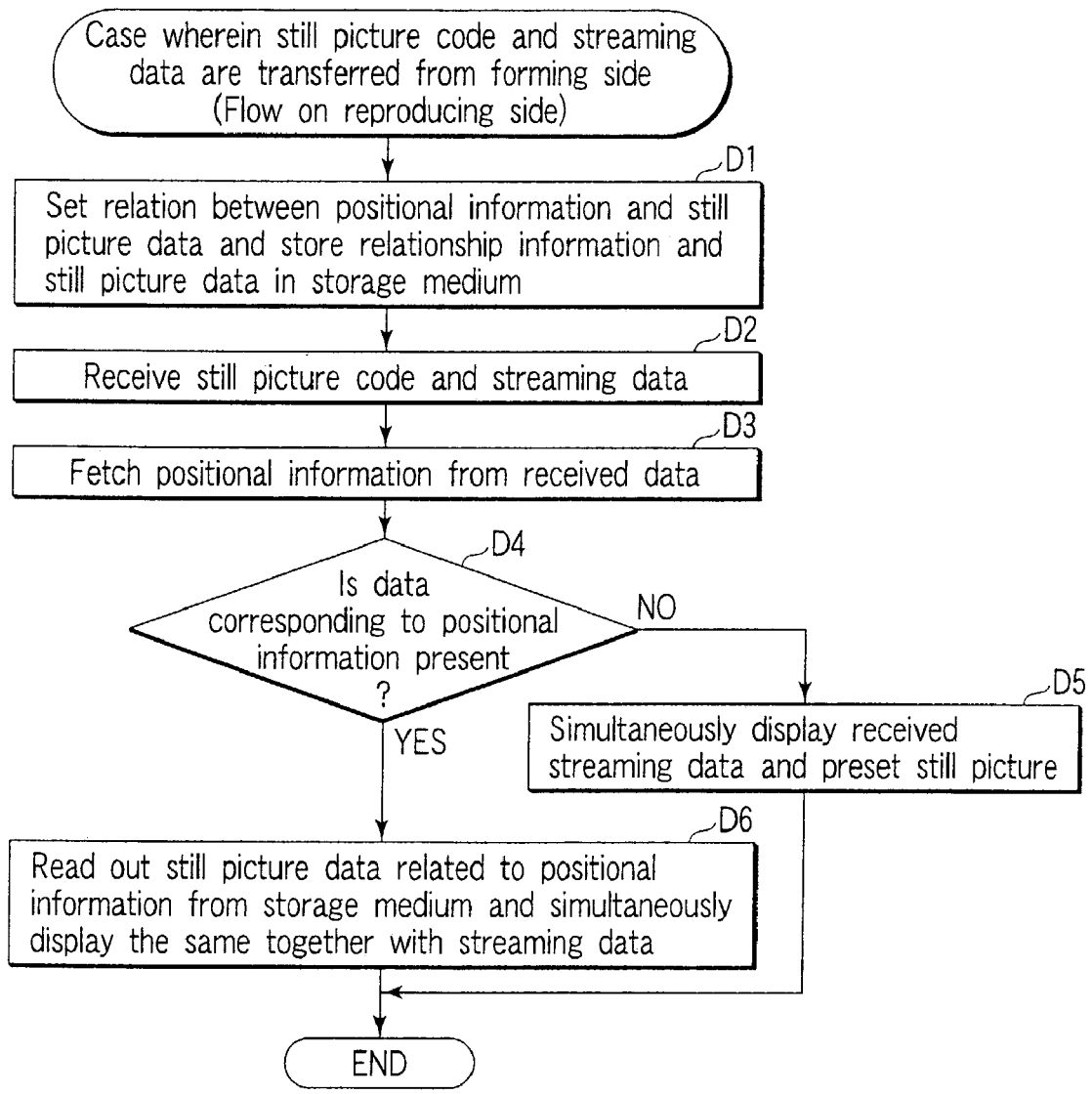
FIG. 13 is a flowchart for illustrating the operation on the reproducing side when a still picture code and streaming data are transferred from the forming side.

Case Wherein Streaming Data and Still Picture Code Including Positional Information Are Transmitted from Forming Side A case wherein streaming data and a still picture code including positional information are transmitted from a forming side is explained with reference to FIGS. 9, 12 and 13.

Figure 9:
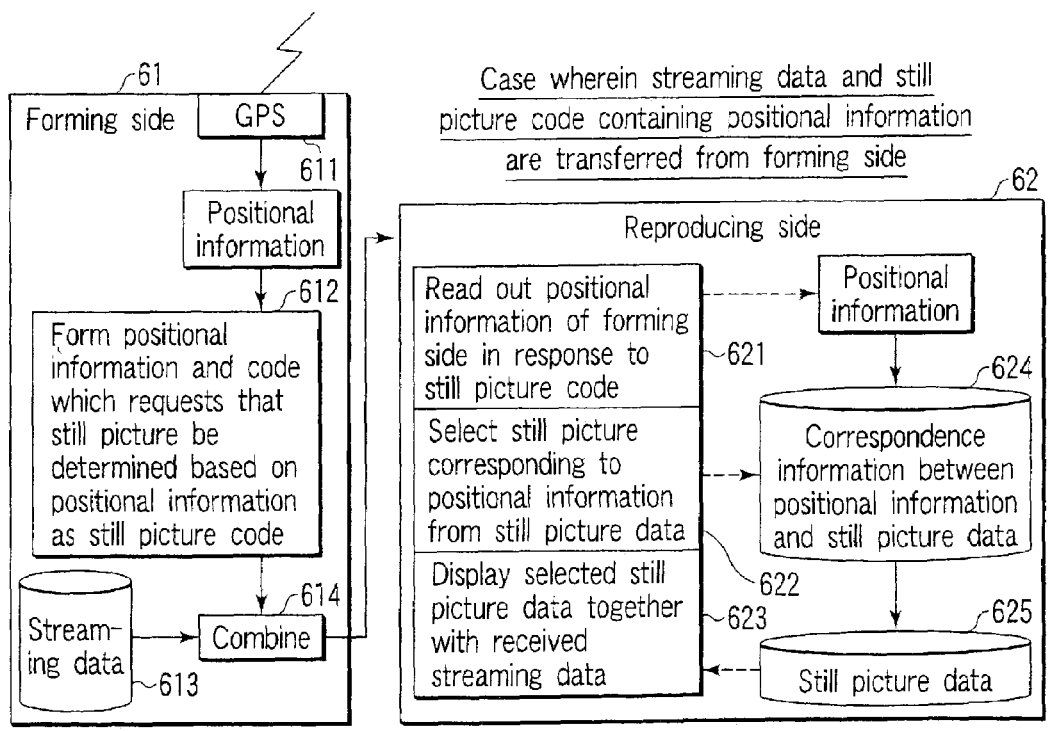
FIG. 9 is a diagram for illustrating an example in which streaming data and a still picture code that contains positional information are transferred from the forming side.

As shown in FIG. 9, a forming side 61 acquires positional information by use of a GPS function 611. In a processing section 612, the acquired positional information and a code which makes a request that still picture data be determined based on the positional information are formed as a still picture code.

The forming section 61 combines in combiner 614 the formed still picture code with streaming data in a streaming data storage section 613 and transmits the combined data to a reproducing side 62.

In a correspondence information storage section 624 provided on the reproducing side 62, an information (table) (such as shown in FIG. 7) stores items (position, range, still picture file name, remark) which define the correspondence relationship between positional information and still picture data.

On the reproducing side 62, positional information is read out from the received still picture code in response to a request of the still picture code in a processing section 621 and still picture data corresponding to the readout positional information is selected from information stored in the correspondence information storage section 624 in a processing section 622. Further, in a processing section 623, the selected still picture data is read out from a still picture data storage section 625 and the readout still picture data and received streaming data are displayed together.

The processing sections 621, 622 and 623 may be implemented using a programmed digital signal processing unit such as a microprocessor with a stored program.

Next, the operation on the forming side performed in a case wherein a still picture code and streaming data are transferred from the forming side is explained with reference to FIG. 12.

First, if a GPS function is provided in a terminal (which is a mobile telephone, for example) of the forming side 61, the relationship between positional information and still picture data is set and the relationship information and still picture data are previously stored in a storage medium (on the reproducing side 62) (step C1). On the forming side 61, streaming data is formed (step C2).

On the forming side 61, utilization of positional information based on the GPS function is specified (step C3).

At this time, it is determined whether or not the GPS function can be used (step C4). If the GPS function cannot be used (e.g., satellite signal can not be received), a message indicating that the GPS function cannot be used is displayed, a state in which positional information is not used is set (step C5) and then a corresponding process is performed. If the GPS function can be used, positional information is read out by use of the GPS function (step C6).

The readout positional information and a code which makes a request that still picture data be selected and displayed based on the positional information are combined to form a still picture code (step C7).

On the other hand, streaming data is compressed and the still picture code is incorporated into a compressed file (step C8).

Thus, information obtained by combining still picture code with streaming data is transmitted to the reproducing side 62 (step C9).

Next, the operation on the reproducing side performed in a case wherein a still picture code and streaming data are transferred from the forming side is explained with reference to FIG. 13.

First, the relationship between positional information and still picture data is set and the relationship information and still picture data are previously stored in a storage medium (on the reproducing side 62) (step D1).

When receiving the still picture code and streaming data (step D2), the reproducing side 62 fetches positional information from the still picture code (step D3).

At this time, whether or not still picture data corresponding to the fetched positional information is present is determined (step D4). If corresponding still picture data is not present, received streaming data and preset still picture data are simultaneously displayed (step D5). If corresponding still picture data is present, the corresponding still picture data is read out from information in the storage section and the readout still picture data and streaming data are simultaneously displayed (step D6).

FIGS. 14A to 14D and FIGS. 15A to 15E are diagrams that facilitate the understanding of the various ways of transmitting data between the forming side and the reproducing side. FIGS. 14A to 14D illustrate some methods of transmitting data when no GPS function is used as in the system shown in FIGS. 2 and 3. FIGS. 15A to 15E depict some methods of transmitting data when the GPS function is used as in the system shown in FIGS. 4, 6 and 7.

In the method shown in any of these figures, the streaming data and the still picture data, which are combined, may be transmitted in the form of one file, or may be transmitted in the form of separate data items. The transfer of data between the forming side and the reproducing side is accomplished via a wireless or wired network (such as the Internet). In the case of a terminal that needs to be dial-connected, such as a mobile telephone, data is transmitted and received via the carrier-C line of the telephone company, as is illustrated in FIGS. 14A to 14D and FIGS. 15A to 15E. In the case of a terminal that need not be dial-connected, data is directly transmitted and received to and from the other side, without using the carrier-C line.

Figure 14A:
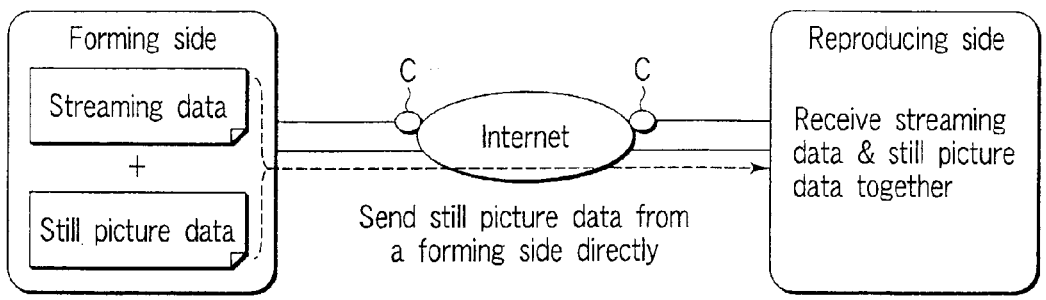
FIGS. 14A to 14D are diagrams illustrating various ways of transmitting data between the forming side and the reproducing side (when no GPS is used)

FIG. 14A illustrates the case where forming side transmits the streaming data and the still picture data together, to the reproducing side. In the reproducing side, the streaming data and the still picture data are displayed together.

Figure 14B:
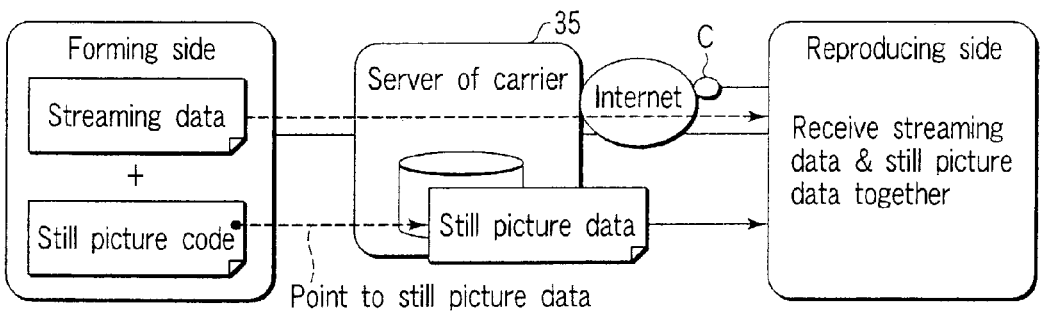

FIG. 14B depicts the case where the streaming data and the still picture code specifying the still picture data are transmitted to the server 35 of a prescribed communications carrier. In the server 35, the still picture data specified by the code is read from the storage medium. The still picture data thus read is transmitted, together with the streaming data, to the reproducing side. In the reproducing side, the streaming data and the still picture data are displayed together.

Figure 14C:
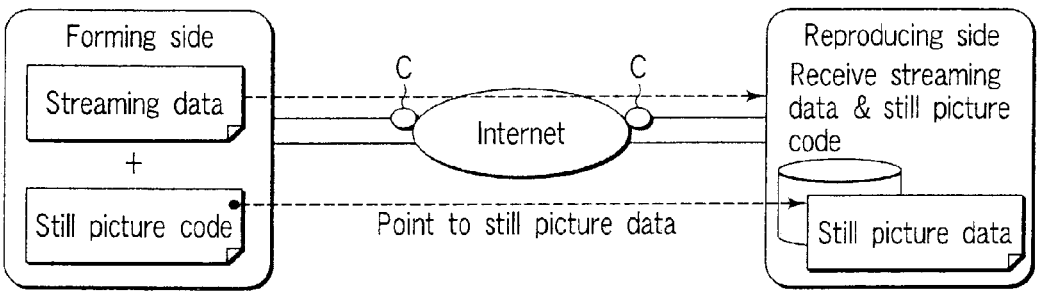

FIG. 14C shows the case where the forming side transmits the streaming data and the still picture code specifying the still picture data, to the reproducing side. In the reproducing side, the still picture data specified by the code is read from the storage medium provided in the reproducing side. The still picture data thus read and the streaming data are displayed together.

Figure 14D:
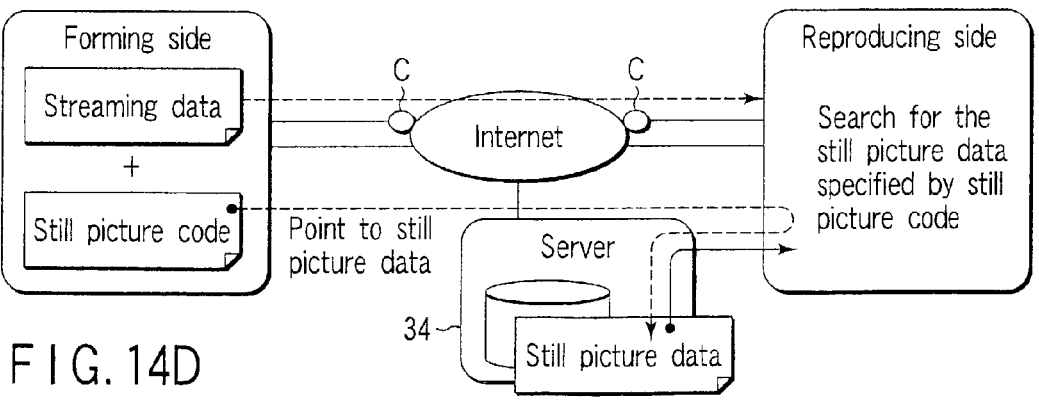

FIG. 14D shows the case where the forming side transmits the streaming data and the still picture code specifying the still picture data, to the reproducing side. In the reproducing side, the still picture data specified by the code is down-loaded from the storage medium that is incorporated in the server 35 provided by the third party. The still picture data down-loaded is displayed, together with the streaming data in the reproducing side.

FIG. 15A illustrates the case where the forming side uses the GPS function, acquiring position information, and reads the still picture data from a storage medium in accordance with the position information, by using a mapping table. (The mapping table is information describing the items that define the relation between the position information and the still picture data such as the table shown in FIG. 7). The forming side transmits the still picture data and the streaming data to the reproducing side. In the reproducing side, the streaming data and the still picture data are displayed together.

FIG. 15B shows the case where the forming side uses the GPS function, acquiring position information, and transmits the streaming data and a code containing the position information, to the reproducing side. In the reproducing side, the still picture data is read from the storage medium by using a mapping table, in accordance with the position information contained in the code, and the still picture data and the streaming data are displayed together.

FIG. 15C depicts the case where the forming side transmits the streaming data and a specific code to the reproducing side. (The specific code contains a command instructing that the GPS function be used to select the still picture data.) In accordance with the specific code the reproducing side uses the GPS function, obtaining position information. Then, the still picture data is read from the storage medium by using a mapping table, and the still picture data and the streaming data are displayed together.

FIG. 15D shows the case where the forming side uses the GPS function, acquiring position information, and transmits the a code containing the position information, together with the streaming data, to the server 35 of the communications carrier. (The code further contains a demand for selecting and transmitting the still picture data to the reproducing side.) The server 35 uses a mapping table, thus reading the still picture data from the storage medium, in accordance with the position information contained in the code received. The server 35 transmits the still picture data and the streaming data to the reproducing side. The reproducing side displays the streaming data and the still picture data together.

FIG. 15E illustrates the case where the forming side uses the GPS function, acquiring position information, and transmits a code containing the position information to the reproducing side, together with the still picture data. (The code contains the address of the server 34 and a demand for selecting the still picture data in the server 34 and transmitting the same to the reproducing side.) The reproducing side transmits the code to the server 34. The server 34 uses a mapping table, thus reading the still picture data from the storage medium, in accordance with the position information contained in the code received. The reproducing side displays the streaming data and the still picture data together.

Thus, according to the present embodiment, when streaming data is reproduced, the streaming data can be displayed in a preferable state by simultaneously displaying desired still picture data and the streaming data with the still picture data surrounding the streaming data.

Further, when streaming data is transmitted to a third party via e-mail or the like, for example, still picture data which the transmitter wants to display can be displayed together with the streaming data on the receiver side.

In addition, when picture data is transferred to the other party, the storage area used on the forming side and the amount of data at the transferring time can be reduced by using a code or the like which specifies still picture information.

Further, a still picture that is suitable for a location in which the terminal exists can be displayed together with the streaming data by using the GPS function.

Also, a display condition that a user wants to set can be finely specified, by providing various functions in the still picture data forming section.

The present invention is not limited to the above embodiment and can be variously modified without departing from the technical scope thereof. For example, various types of constituents shown in the drawings can be selectively combined to configure another constituent.

As described above, according to the present invention, it is possible to simultaneously display streaming data and still picture data, which corresponds to a blank portion surrounding a reproducing portion of the streaming data, in a favorable state as expected or desired by a user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information apparatus capable of forming a picture, comprising:
    a data forming section configured to form a combination of streaming data and one of (1) still picture data and (2) a code used to obtain still picture data; and
    a data transferring section configured to transfer the formed combination of the streaming data and the one of (1) the still picture data and (2) the code to another apparatus
    wherein the data transferring section transfers the streaming data with the code and the another apparatus includes a predetermined communication carrier, and the predetermined communication carrier transmits the streaming data and still picture data corresponding to the code to other apparatus, said other apparatus having a display for displaying said streaming data and said still picture data.

2. An information apparatus, comprising:
    a display screen;
    a data acquiring section configured to acquire streaming data and one of still picture data and a code used to obtain still picture data; and
    a data displaying section configured to simultaneously display the acquired streaming data and one of (1) the still picture data and (2) the still picture data obtained from the code on said display screen
    wherein a substitute still picture data stored in the information apparatus is used if still picture data determined based on the code cannot be acquired when the code is transferred to the information apparatus.

3. The information apparatus according to claim 2, wherein the data acquiring section acquires the streaming data and the one of the still picture data and the code from an apparatus capable of forming a picture.

4. The information apparatus according to claim 2, wherein the data acquiring section acquires the streaming data and the still picture data obtained from the code from a communication carrier.

5. A method of displaying a picture on an information apparatus, comprising:
    transferring one of (1) first data items constituted by streaming data and still picture data, and (2) second data items constituted by streaming data and a code used to determine still picture data to the information apparatus; and
    simultaneously displaying one of (1) the transferred streaming data and still picture data, and (2) the streaming data and still picture data determined based on the code on a display screen of the information apparatus;
    wherein the transferring includes modifying the size of a still picture and transferring a plurality of the size modified still pictures to the information apparatus, and
    the method further comprises arranging the plurality of size modified still pictures transferred to the information apparatus on a display screen of the information apparatus and displaying streaming data superposed on the size modified still pictures.

6. A method of displaying a picture on an information apparatus, comprising:
    transferring one of (1) first data items constituted by streaming data and still picture data, and (2) second data items constituted by streaming data and a code used to determine still picture data to the information apparatus;
    simultaneously displaying one of (1) the transferred streaming data and still picture data, and (2) the streaming data and still picture data determined based on the code on a display screen of the information apparatus; and
    using a substitute still picture data stored in the information apparatus if still picture data determined based on the code cannot be acquired when the code is transferred to the information apparatus.

7. A mobile telephone, comprising:
    a data acquiring section configured to acquire streaming data and one of still picture data and a code used to obtain still picture data;
    a display; and
    a data displaying section configured to simultaneously display the acquired streaming data and one of the still picture data and still picture data obtained from the code on the display;
    wherein a substitute still picture data stored in the information apparatus is used if still picture data determined based on the code cannot be acquired when the code is transferred to the information apparatus.

8. A mobile telephone according to claim 7, wherein the data displaying section displays the acquired streaming data instead of a part of the still picture data.

9. A mobile telephone according to claim 7, wherein said data display section displays said still picture data in a manner that surrounds said streaming data.

10. A mobile telephone according to claim 7, wherein said data display section displays said streaming data in a such a manner that the streaming data is superimposed on said still picture data.

11. An information apparatus, comprising:
    a display screen;
    a data acquiring section configured to acquire streaming data and one of still picture data and a code used to obtain still picture data; and
    a data displaying section configured to simultaneously display the acquired streaming data and one of (1) the still picture data and (2) the still picture data obtained from the code on said display screen,
    wherein said one of said still picture data and said still picture data obtained from code provide a plurality of size modified still pictures displayed on the display screen and the streaming data is displayed superposed on the size modified still pictures.

12. A mobile telephone, comprising:
    a data acquiring section configured to acquire streaming data and one of still picture data and a code used to obtain still picture data;
    a display; and
    a data displaying section configured to simultaneously display the acquired streaming data and one of the still picture data and still picture data obtained from the code on the display,
    wherein said one of said still picture data and said still picture data obtained from code provide a plurality of size modified still pictures displayed on the display and the streaming data is displayed superposed on the size modified still pictures.

* * * * *